May 2, 1961 H. L. PAGE 2,982,025
DENTAL INSTRUMENT
Filed Aug. 1, 1958 2 Sheets-Sheet 1

HARRY L. PAGE INVENTOR
Caswell & Lagaard
ATTORNEYS

May 2, 1961

H. L. PAGE 2,982,025

DENTAL INSTRUMENT

Filed Aug. 1, 1958

HARRY L. PAGE INVENTOR

Caswell & Lagaard

ATTORNEYS

United States Patent Office 2,982,025
Patented May 2, 1961

2,982,025

DENTAL INSTRUMENT

Harry L. Page, Valparaiso, Ind., assignor to Transograph Incorporated, Minneapolis, Minn., a corporation of Minnesota Filed Aug. 1, 1958, Ser. No. 752,669

8 Claims. (Cl. 32—32)

The herein disclosed invention relates to dental instruments and methods of use thereof and particularly to instruments and methods which will accurately record and automatically reproduce in three dimensions simultaneously the kinematic and static relationships of the upper and lower jaws and upper and lower teeth both natural and artificial.

In Patent No. 2,713,721, issued to Harry L. Page, July 26, 1955, for Dental Instrument, a device and method were disclosed for the purpose. In the instrument of the patent the transverse temporomandibular joint axes were accurately determined. The vertical temporomandibular joint axes were, however, positioned in planes containing the transverse temporomandibular joint axes and correction to variance thereof in human anatomy was accomplished by utilizing a jaw movement guide which forced the jaw models to move in the proper paths by springing the parts of the slightly flexible instrument.

An object of the invention resides in providing a construction whereby the jaw models may move relative to one another about the proper vertical axes without disturbing the accuracy of the movement about the transverse axes.

A still further object of the invention resides in providing hinge means in said joint having a substantially vertical axis and adjustable in directions at right angles to the axis thereof.

Another object of the invention resides in providing a construction utilizing a centering device separate from the vertical hinge means.

An object of the invention resides in constructing the vertical hinge means with a bearing and a journal and in providing adjustable supporting means between one thereof and a part carried by the apposing device of the instrument and adjustable supporting means between the other thereof and a part carried by the hinge bow of the instrument.

A still further object of the invention resides in providing the joint with a slider carried by said apposing device and a slide carried by said hinge bow, together with adjustable supporting means between said journal and one thereof and other adjustable supporting means between said bearing and the other thereof.

Another object of the invention resides in the method of determining the proper location of the axes of the vertical hinge means with reference to the apposing device and the hinge bow.

Other objects of the invention reside in the novel combination and arrangement of parts and in the details of construction hereinafter illustrated and/or described.

Figure 1:
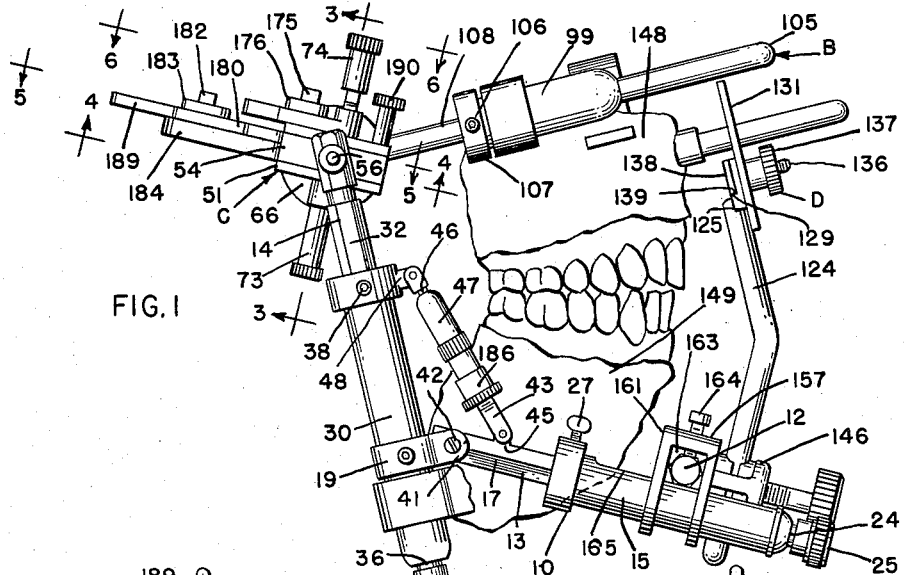
Fig. 1 is a side view of a dental instrument illustrating an embodiment of the invention.

The construction shown in the drawings comprises a hinge bow A consisting of two side frames connected to a crossbar. These side frames support adjustable hinge axis pins which, when the device is mounted on the patient's head, may be adjusted to register with the projections of the transverse temporomandibular axes on the patient's face. Associated with the hinge bow is a head relator (not shown) which may be adjustably mounted on the hinge bow and to which may be attached a bite block or wax bite mounted in the patient's mouth and which serves to support the entire instrument thereby. After the instrument has been properly oriented with reference to the natural symmetries and/or asymmetries of the skull and of the mandible, an apposing device B is pivoted to the frames of the hinge bow by means of temporomandibular hinge joints C which permit pivotal movement about the temporomandibular hinge axes and sliding movements in planes parallel to said axes and pivotal movement about vertical axes normal to such planes. A jaw movement guide D is also used with the instrument.

Figure 2:
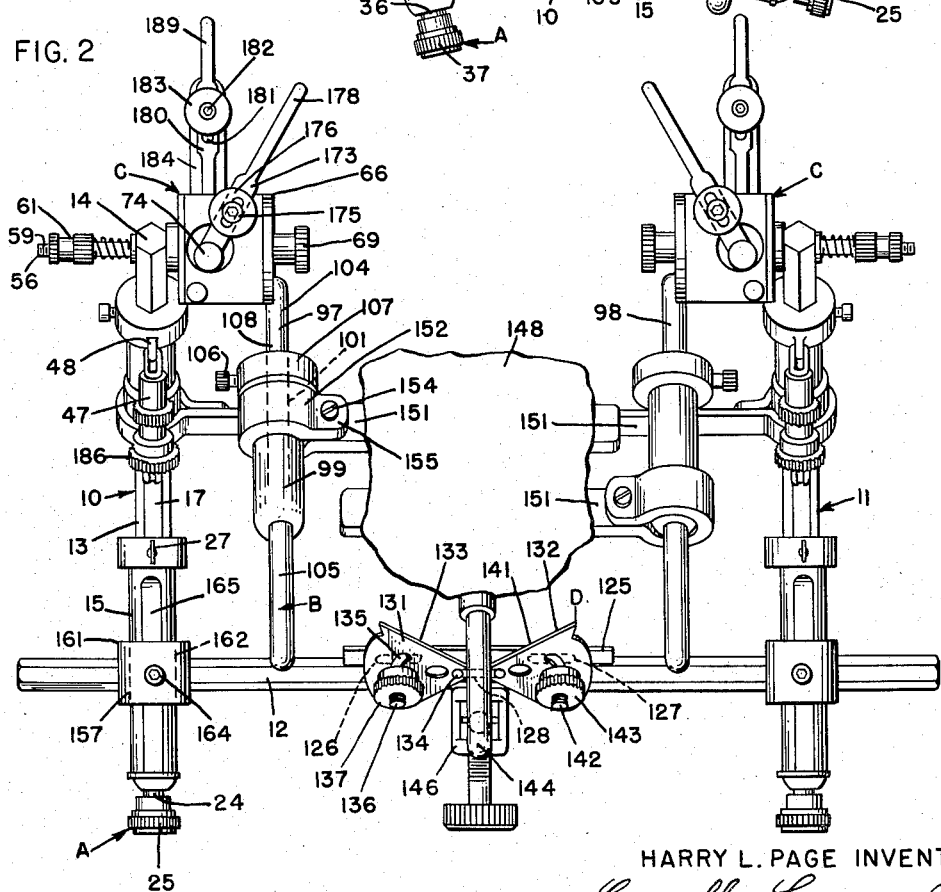
Fig. 2 is a front elevational view of the same.
Figure 3:
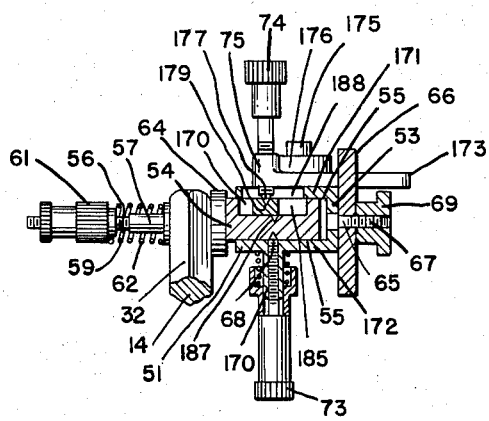
Fig. 3 is an elevational-sectional view taken on line 3—3 of Fig. 1.

For the purpose of illustrating the invention, a portion of a dental instrument such as disclosed in my Patent Number 2,713,721, issued July 26, 1955, for Dental Instrument, has been shown in Figs. 1 and 2. This dental instrument comprises the hinge bow A which consists of two side frames 10 and 11 which are similar in construction. Only the side frame 10 will hence be described. These side frames are attached to a crossbar 12 by means of connectors 157. The frame 10 consists of a horizontal arm 13 and to which is pivotally connected an upright arm 14.

The horizontal arm 13 comprises a barrel 15 in which is slidably mounted a stem 17 which is pivoted to a clevis 19. The stem 17 is adapted to be moved longitudinally in the barrel 15 by means of a screw 24 which is screwed into threads formed in said stem and which is held from longitudinal movement. This screw is rotated by means of a head 25 formed at the outer end of the same. By means of this construction, the stem may be shifted longitudinally with respect to the barrel 15. A lock screw 27 screwed into the end of the barrel 15 serves to hold the stem 17 in adjusted position. The upright arm 14, similar to the arm 13, comprises a barrel 30 and in which is slidably mounted a stem 32 forming part of said upright arm. A hinge pin 56 is mounted in the upper end of the stem 32. The stem 32 is adjustable longitudinally along the barrel 30 by means of a screw 36 having a head 37 and which operates similarly to the screw 24. A lock screw 38 engaging said stem locks the stem in adjusted position. The upright arm 14 is hingedly connected to the horizontal arm 13 by means of the clevis 19. This clevis is attached to barrel 30 and is formed with spaced legs 41 which straddle the stem 17. Screws passing through each of the legs, one of which is designated by the reference numeral 42, extend through said legs and are screwed into the stem 17. By means of this construction, the upright arm may be swung relative to the horizontal arm.

The angularity between the arms 13 and 14 may be adjusted by means of an adjusting screw 43. This screw is pivoted to a post 45 issuing outwardly from the arm 17 and has an elongated nut 47 screwed on the same. Swively attached to the nut 47 is a headed shank 46 which is pivoted to a post 48 issuing outwardly from the barrel 30. By means of this construction, rotation of the nut 47 causes elongation or shortening of the distances of the posts 45 and 48 and correspondingly adjustment of the angularity of the arms 13 and 14. A lock nut 186 screwed on screw 43 and engaging nut 47 holds the parts in adjusted position.

Each of the connectors 157 consists of a body 161 having a bore 162 therein receiving the barrel 15 of arm 13. A kerf 163 in said body receives the crossbar 12 which lies upon a flat 165 on barrel 15 and a screw 164 screwed into said body and engaging said crossbar clamps the parts together.

At the upper end of the stem 32 of arm 14 of frame 10 is mounted a temporomandibular joint C. This joint comprises a slider 51 which is constructed with upper and lower spaced plates 171 and 172 having a connecting portion 53 therebetween. These plates are adapted to straddle a slide 54 which is also plate-like in form and somewhat thicker than the plates 171 and 172. In the form of the invention shown, said slide 54 engages the engaging surfaces 55 of the slider 51 which guide the said slide for translatory movement in the planes of these surfaces. The slide 54 has brazed to it the hinge pin 56 which is journaled in a bearing 57 attached to the upper end of the stem 32 of arm 14. The pin 56 is threaded at its outer end, as indicated at 59, to receive a nut 61. Between the said nut and the end of the bearing 57 is a compression coil spring 62 which urges the edge 63 of the slide 54 against a flange 64 formed on the bearing 57. This construction takes up the end play in the joint and maintains the slide 54 in proper position with reference to frame 10 allowing limited relative axial movement therebetween. A lock screw 119 screwed in plate 171 of slider 51 engages slide 54 and serves to lock these parts from movement.

The connecting portion 53 of slider 51 has issuing outwardly from it a trunnion 65. On this trunnion is rotatably mounted an adjusting disc 66. The trunnion 65 is formed with threads 67 at its outer end and on which is screwed a lock nut 69. Lock nut 69, when tightened against the disc 66, holds said disc in adjusted position relative to the slide and slider.

Figure 4:
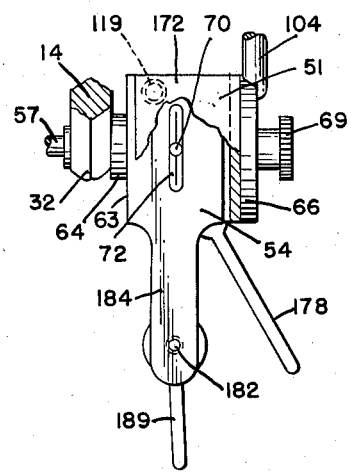
Fig. 4 is a sectional view taken on line 4—4 of Fig. 1.
Figure 5:
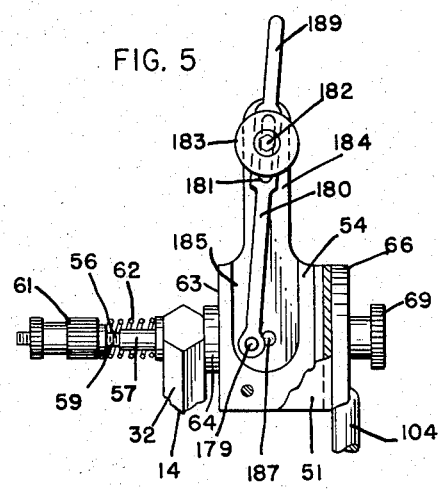
Fig. 5 is a view similar to Fig. 4 and taken on line 5—5 of Fig. 1.
Figure 6:
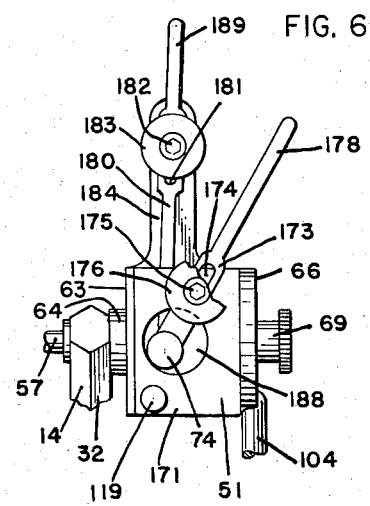
Fig. 6 is a view similar to Fig. 5 taken on line 6—6 of Fig. 1.

For the purpose of maintaining the slide 54 in engagement with the slider 51, the said slide is constructed on the underside thereof, as shown in Fig. 4, with a groove 72 which termintes short of the ends of said slide. A centering screw 73 screwed in a boss 170 attached to the lower plate 172 of slider 51 is received within this groove and limits the movement of the slider with reference to the slide. The end 68 of the said centering screw is conical in form and engages a conical centering socket 70 formed in the slide 54 at approximately the middle of the said plate. On the other side of slide 54 is another conical socket 187 which is in axial alignment with socket 70. The slider 51 may pivot relative to the slide 54 about an axis at right angles to the surfaces 55 of said slide. This is accomplished by means of a vertical axis screw 74 which is screwed into a boss 75 attached to an adjustable vertical axis arm 173, best shown in Fig. 6. This arm is provided with a slot 174 extending longitudinally thereof and through which a screw 175 extends. Screw 175 is screwed into plate 171. A washer 176 encircles said screw and engages the upper surface of arm 173 to clamp said arm in adjusted position with reference to the slider 51. The outer end of the arm 173 is formed with a finger piece 178 by means of which the same may be manipulated. The screw 74 is formed with a conical end 177 which is adapted to become seated in a conical socket 179 in a positioning arm 180. Arm 180 is similar to arm 173 and has a longitudinally extending slot 181 therein. A screw 182 passes through a washer 183 which overlies the slotted portion of the arm 180 and is screwed into an extension 184 of the slide 54. This arm operates in a depression 185 in said slide, the bottom of which is coplanar with the upper surface of the extension 184 and may be manipulated by means of a finger piece 189 issuing therefrom. By means of the construction described, the socket 179 may be moved about and adjustably secured in position through the screw 182. The screw 74 extends through a hole 188 in plate 171 and is engageable with socket 179. This socket and said screw forms the vertical hinge means for the joint C, the socket 179 forming the bearing and the conical end 177 forming the journal of said hinge means.

The apposing device B consists of two arms 97 and 98. Both of these arms are similar in construction and only the arm 97 will be described. This arm has a barrel 99 which is formed with a bore 101. Received in this bore is a rod 104. The rod 104 is brazed to the adjusting disc 66 as best shown in Fig. 2. The rod 104 may be slidably mounted in the bore 101 by means of a set screw 106 screwed in a boss 107 formed on the barrel 99 and engaging a flat 108 on said rod. Issuing outwardly from the barrel 99 is a contactor 105 which is adapted to engage the head relator of the instrument, which has not been shown in the drawings.

In the drawings, an upper jaw model 148 and a lower jaw model 149 have been shown. These jaw models are attached to the apposing device B and to the hinge bow A by attaching means consisting of mounting fingers 151. The said fingers have loops 152 which receive the barrels 99 of the apposing device and the barrels 30 of the arms 14 of the hinge bow. The said fingers are clamped to the said barrels by means of clamping screws 154 which extend through said fingers and through extensions 155 on the ends of loops 152. These fingers become embedded in the cementing material used for mounting the models on the instrument.

The jaw movement guide D is best shown in Figs. 1 and 2. This guide includes a standard 124 and is attached to the rod 12 by means of a connector 146. Said standard has attached to the upper end of the same a crossbar 125. This crossbar has formed in it two aligning slots 126 and 127 and a groove 128. Adjacent to and parallel with these slots and groove is a shoulder 129 which extends throughout the length of the crossbar. In conjunction with the said crossbar, two cams 131 and 132 are employed, which are identical in construction excepting that the one is left-handed and the other right-handed. For this reason, only the cam 131 will be described in detail. This cam is segmental-shaped in form and has an edge 133 which serves as a cam surface. At the vertex of the said cam is provided a trunnion 134 which extends outwardly therefrom. This trunnion is adapted to be received in the groove 128 and is slidable and rotatable therein. Concentric with the axis of the trunnion 134 is formed in the cam 131 an arcuate slot 135 which is adapted to overlie the slot 126. A screw 136 is adapted to extend through the slot 126 and the slot 135 and has a nut 137 screwed on the end of the same and which serves to clamp the parts together. To prevent rotation of the said screw, the head 138 of said screw is formed with a flat 139 which engages the shoulder 129. The cam 132 has a cam surface 141 which corresponds with the cam surface 133 and similarly is provided with a screw 142 on which is screwed a nut 143. It will readily be comprehended that the cams may be moved from and toward one another and that the same may be rotated on the trunnions 134 to adjust the angularity of the cam surfaces 133 and 141 and the proximity of said surfaces to one another. Operating in conjunction with the cams 131 and 132 is a cam follower 144. This follower is in the form of a rod which is attached to the apposing device B or to any part movable therewith.

The method of using the invention is as follows: The projections of the temporomandibular joint transverse axes on the patient's face are determined as disclosed in the aforementioned patent and the instrument mounted on bite blocks or wax bites, as the case may be, supported between the patient's jaws. The instrument is then oriented with reference to said projections to bring the axes of the hinge joints into register with the projections of the transverse temporomandibular joint axes of the patient. The instrument is next removed from the patient's head and the apposing device B applied to the instrument. This is accomplished by substituting for the hinge pins used in orienting the instrument to the patient's anatomy the hinge joints C with the apposing device B attached thereto. In the former instrument, the vertical axes of the joints were fixed with reference to the transverse axes. In the instant invention, these axes are adjusted to correspond with the anatomy of the patient which is accomplished as follows: The instrument is first placed in neutral position by first disengaging screws 74 from positioning arms 180 if in engagement therewith and then tightening the centering screws 73 on both sides until the conical ends 68 thereof enter the sockets 70 in the slides 54. The jaw models are then applied to the wax bite or bite blocks on which the instrument is mounted and are cemented to the hinge bow and apposing device. The head relator and attached wax bite or bite blocks are then removed. When the parts are so disposed, centered wax bites or bite blocks will be received by the models. While the centered wax bite or bite blocks between the jaw models are in occlusion, positioning arms 180 are released by loosening screws 182. These arms are then moved outwardly to expose sockets 187 which are coaxial with sockets 70. The vertical axis arms 173 are next released by loosening screws 175 and said arms are adjusted to allow the conical ends 177 of vertical axis screws 74 to enter the sockets 187. The vertical axis arms 173 are then locked in position by tightening screws 175. Lock screws 190, the centering screws 73, and the vertical axis screws 74 are then unscrewed allowing the sliders 51 to slide freely relative to the slides 54. The models are then opened and adjusted to accept either a right hand or a left hand lateral wax bite or bite blocks procured by having the patient shift his lower jaw to the left or to the right side of the cranium while the wax bite or bite blocks are being prepared. Assume that a right lateral bite is selected, the right positioning arm 180 is released by loosening screw 182 and adjusted until the conical end 177 of the vertical axis screw 74 registers with the socket 179 therein. Screw 74 is next screwed down to seat said conical end in said socket. Positioning arm 180 is next locked in position by tightening screw 182. The right vertical axis screw 74 is next released and the right lateral bite removed. Next, the centered bite is replaced between the models and both centering screws 73 are tightened to seat the conical ends 68 of the same in the sockets 70. The right vertical axis arm 173 is then released by loosening screw 175 and said arm adjusted until the conical end 177 of the vertical axis screw 74 registers with the conical socket 179 of the positioning arm 180. The said end is then seated in said socket. The arm 173 is then locked in position by tightening screw 175. Both of the centering screws 73 are now released from engagement with sockets 70 but are still retained in the slots 71 to limit relative sliding movement between the slider 51 and the slide 54. The models will now accept centered wax bites produced by various jaw opening positions and right lateral wax bites produced by various open and right lateral positions of the jaws. The procedure is then repeated for the left side and the left vertical axis screw 74 and socket 179 similarly adjusted to coaxial relationship with the left vertical temporomandibular joint axis of the patient.

The advantages of the invention are manifest. The vertical axes are accurately recorded and reproduced to procure more accurate reproduction of the horizontal component of the patient's jaw movements. Adjustments can be easily and positively procured. The apparatus is simple in construction and the method readily mastered. Sufficient latitude is possible with all adjustments to accommodate extreme cases. The adjustments with reference to the various axes are independent of one another and have no deleterious effect on the adjustments or accuracies of the other axes.

Changes in the specific form of the invention, as herein described, may be made within the scope of what is claimed without departing from the spirit of the invention.

Having described the invention, what is claimed as new and desired to be protected by Letters Patent is:

1. In a dental instrument having a hinge bow provided with spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of said arms and frames including a condyle slide carried by one of said parts, said slide having a guide surface lying in a plane substantially parallel with the transverse temporomandibular axis of said parts, a slider carried by the other of said parts and having a surface engaging the surface of said slide, retaining means for retaining said slide and slider in sliding relation with reference to said surfaces, said hinge joint including hinge means for guiding said apposing device for swinging movement about the transverse temporomandibular axis, a bearing and a journal cooperating therewith one thereof being carried by said slide and the other by said slider, the axis of said bearing and journal being substantially at right angles to said surface, said journal and bearing being relatively axially slidable to engage or disengage the journal from the bearing, the combination of guide means for said journal and supporting said journal for movement in directions normal to the axis thereof, guide means for said bearing and supporting said bearing for movement in directions normal to the axis thereof, and locking means engaging parts fixed relative to said journal and bearing and holding said journal and bearing in coaxial relation.

2. In a dental instrument having a hinge bow provided with spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of the said arms and frames including a condyle slide carried by said hinge bow, said slide having a guide surface lying in a plane substantially parallel with the transverse temporomandibular axis of said parts, a slider carried by said apposing device, retaining means for retaining said slide and slider in sliding relation with reference to said surfaces, said hinge joint including hinge means for guiding said apposing device for swinging movement about the transverse temporomandibular axis, a bearing and a journal cooperating therewith, one thereof being carried by said slide and the other by said slider, the axis of said bearing and journal being substantially at right angles to said surface, said journal and bearing being relatively axially slidable to engage or disengage the journal from the bearing, the combination of guide means for said journal and supporting said journal for movement in directions normal to the axis thereof, guide means for said bearing and supporting said bearing for movement in directions normal to the axis thereof, and locking means engaging parts fixed relative to said journal and bearing and holding said journal and bearing in coaxial relation.

3. In a dental instrument having a hinge bow provided with spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of said arms and frames including a condyle slide carried by said hinge bow, said slide having a guide surface lying in a plane substantially parallel with the transverse temporomandibular axis of said parts, a slider carried by said apposing device, retaining means for retaining said slide and slider in sliding relation with reference to said surfaces, said hinge joint including hinge means for guiding said apposing device for swinging movement about the transverse temporomandibular axis, a bearing and a journal cooperating therewith, said journal being carried by said slider and said bearing being carried by said slide, the axis of said bearing and journal being substantially at right angles to said surface, said journal and bearing being relatively axially slidable to engage or disengage the journal from the bearing, the combination of guide means for said journal and supporting said journal for movement in directions normal to the axis thereof, guide means for said bearing and supporting said bearing for movement in directions normal to the axis thereof, and locking means engaging parts fixed relative to said journal and bearing and holding said journal and bearing in coaxial relation.

4. In a dental instrument having a hinge bow provided with spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of the said arms and frames including a condyle slide carried by said hinge bow, said slide having a guide surface lying in a plane substantially parallel with the transverse temporomandibular axis of said parts, a slider carried by said apposing device, retaining means for retaining said slide and slider in sliding relation with reference to said surfaces, said hinge joint including hinge means for guiding said apposing device for swinging movement about the transverse temporomandibular axis, a bearing and a journal cooperating therewith, said journal being carried by said slider and said bearing being carried by said slide, the axis of said bearing and journal being substantially at right angles to said surface, said journal and bearing being relatively axially slidable to engage or disengage the journal from the bearing, the combination of an adjustable arm pivotally and slidably mounted on said slider and supporting said journal, means engaging said arm and slider and locking said arm in adjusted position, a second adjustable arm pivotally and slidably mounted on said slide and supporting said bearing, locking means engaging said second named arm and said slide and locking said second named arm in adjusted position.

5. In a dental instrument having a hinge bow provided with spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of the said arms and frames including a condyle slide carried by said hinge bow, said slide having a guide surface lying in a plane substantially parallel with the transverse temporomandibular axis of said parts, a slider carried by said apposing device, retaining means for retaining said slide and slider in sliding relation with reference to said surfaces, said hinge joint including hinge means for guiding said apposing device for swinging movement about the transverse temporomandibular axis, a bearing and a journal cooperating therewith, said journal being carried by said slider and said bearing being carried by said slide, the axis of said bearing and journal being substantially at right angles to said surface, said journal and bearing being relatively axially slidable to engage or disengage the journal from the bearing, the combination of an arm overlying said slider and having a slot therein extending longitudinally thereof, a washer overlying said arm at said slot, a screw extending through said washer and slot and screwed into said slider, a boss on said arm, a screw screwed into said boss and carrying said journal, a second adjustable arm pivotally and slidably mounted on said slide and supporting said bearing, locking means engaging said second named arm and said slide and locking said second named arm in adjusted position.

6. In a dental instrument having a hinge bow provided with spaced frames, attaching means mounted on the hinge bow and attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of the said arms and frames including a condyle slide carried by said hinge bow, said slide having a guide surface lying in a plane substantially parallel with the transverse temporomandibular axis of said parts, a slider carried by said apposing device, retaining means for retaining said slide and slider in sliding relation with reference to said surfaces, said hinge joint including hinge means for guiding said apposing device for swinging movement about the transverse temporomandibular axis, a bearing and a journal cooperating therewith, said journal being carried by said slider and said bearing being carried by said slide, the axis of said bearing and journal being substantially at right angles to said surface, said journal and bearing being relatively axially slidable to engage or disengage the journal from the bearing, the combination of an adjustable arm pivotally and slidably mounted on said slider and supporting said journal, means engaging said arm and slider and locking said arm in adjusted position, a second arm overlying said slider and having a slot therein extending longitudinally thereof, a washer overlying said arm at said slot, a screw extending through said washer and slot and screwed into said slider, said bearing being carried by said second arm.

7. The method of mounting jaw models by the use of lateral wax bites or bite blocks for movement about the temporomandibular joint vertical axes on a dental instrument comprising a hinge bow provided with spaced frames, attaching means mounted on the hinge bow for attaching the hinge bow to a lower jaw model, an apposing device having spaced arms, attaching means mounted on the apposing device and attaching the apposing device to the upper jaw model corresponding with the lower jaw model, said arms and frame having juxtaposed parts situated at the transverse temporomandibular axes, a hinge joint for each of the said arms and frames including a condyle slide carried by said hinge bow, said slide having a guide surface lying in a plane substantially parallel with the transverse temporomandibular axis of said parts and a centering socket therein, a slider carried by said apposing device, retaining means for retaining said slide and slider in sliding relation with reference to said surfaces, said hinge joints each including transverse hinge means for guiding said apposing device for swinging movement about the transverse temporomandibular axis, said hinge joints each having vertical hinge means comprising a bearing and a journal cooperating therewith, said journal being carried by said slider and said bearing being carried by said slide, the axis of said bearing and journal being substantially at right angles to said surface, said journal and bearing being relatively axially slidable to engage or disengage the journal from the bearing, an adjustable vertical axis arm pivotally and slidably mounted on said slider and supporting said journal, locking means engaging said arm and slider and locking said arm in adjusted position, a positioning arm overlying said slide, said bearing being carried by said second arm, locking means engaging said positioning arm and slider and locking said arm in adjusted position, said method comprising mounting the instrument on a wax bite disposed between the patient's jaws, bringing the axes of the hinge joints into register with the projections of the patient's temporomandibular joint transverse axes on his face, removing the instrument from the patient's head, attaching the apposing device to the hinge bow, mounting the jaw models on the hinge bow and apposing device with the models accepted by the wax bite or bite blocks, removing the same, procuring relative axial movement of the journals and bearings to disengage the same, adjusting the vertical axis arms to bring the axes of said journals in planes containing the transverse axes with the models in centric position, operating the locking means for said arms to hold the journals fixed relative to said sliders, freezing the slides and sliders for relative sliding movement, bringing the models in occlusion with a lateral wax bite or bite block made with the lower jaw of the patient moved to one side of his cranium; adjusting the positioning arm of the hinge joint on the same side of the cranium to bring the bearing carried thereby into coaxial relationship with the corresponding journal, operating the locking means for said positioning arm to hold the bearing in fixed relation relative to the slide by which it is carried, removing the lateral wax bite or bite blocks, returning the models to centric position, freeing the vertical axis arm for transverse movement, adjusting the same to bring the journal carried thereby into coaxial relationship with the corresponding bearing and repeating the method on the other joint and with a corresponding wax bite made with the lower jaw moved to the opposite side of the cranium.

8. The method of mounting jaw models by the use of lateral wax bites or bite blocks for movement about the temporomandibular joint vertical axes on a dental instrument comprising a hinge bow for supporting a lower jaw model, an apposing device for supporting an upper jaw model, spaced hinge joints between said hinge bow and apposing device each comprising two relatively sliding parts, one being carried by the hinge bow and the other by the apposing device, said hinge joints each comprising transverse axis hinge means for guiding the apposing device for swinging movement about transverse temporomandibular axes, vertical axis hinge means between said sliding parts each including two relatively swinging parts, lateral adjusting and locking means between one thereof and one of said sliding parts and other lateral adjusting and locking means between the other thereof and the other sliding part, said hinge parts being axially relatively slidable to engage or disengage the same, said method comprising mounting the instrument on a wax bite or bite blocks disposed between the patient's jaws, bringing the axes of the hinge joints into register with the projections of the patient's temporomandibular joint transverse axes on his face, removing the instrument from the patient's head, attaching the apposing device to the hinge bow, mounting the jaw models on the hinge bow and apposing device with the models accepted by the wax bite or bite blocks, removing the wax bite or bite blocks, procuring relative axial movement of the hinge parts to disengage the same, adjusting the hinge parts carried by the apposing device to bring the axes of said parts into planes containing the temporomandibular transverse axes, with the models in centric positions, freeing the sliding parts for relative sliding movement, bringing the models in occlusion with a lateral wax bite or bite blocks made with the lower jaw of the patient moved to one side of his cranium, adjusting the other hinge part of the vertical hinge joint of the hinge joint on the same side of the cranium to bring said hinge parts in coaxial relationship, locking said last named hinge part in adjusted position relative to the sliding part by means of which it is carried, removing the lateral wax bite or bite blocks, returning the models to centric position, freeing the first named hinge part for transverse movement, adjusting said hinge part transversely to bring said hinge parts into coaxial relationship and repeating the method on the other hinge joint and with a corresponding wax bite or bite blocks made with the lower jaw moved to the opposite side of the cranium.

No references cited.

UNITED STATES PATENT OFFICE
CERTIFICATE OF CORRECTION

Patent No. 2,982,025                                            May 2, 1961

Harry L. Page

It is hereby certified that error appears in the above numbered patent requiring correction and that the said Letters Patent should read as corrected below.

Column 9, line 18, for "freezing" read --- freeing ---.

Signed and sealed this 17th day of October 1961.

(SEAL)
Attest:

ERNEST W. SWIDER
Attesting Officer

DAVID L. LADD
Commissioner of Patents
USCOMM-DC